Sept. 8, 1964   L. E. BISCHOFF ETAL   3,147,632
WINDSHIELD WASHER PUMP ASSEMBLY
Filed March 5, 1962

INVENTORS
Leo E. Bischoff
Arnold Schollnick
BY
Their Attorney

United States Patent Office 3,147,632
Patented Sept. 8, 1964

3,147,632
WINDSHIELD WASHER PUMP ASSEMBLY
Leo E. Bischoff and Arnold Schollnick, Rochester, N.Y.,
assignors to General Motors Corporation, Detroit,
Mich., a corporation of Delaware
Filed Mar. 5, 1962, Ser. No. 177,662
6 Claims. (Cl. 74—128)

This invention pertains to windshield washers, and particularly to an improved washer pump assembly having an interruptible driving connection with a wiper motor.

In copending application Serial No. 126,051 filed July 24, 1961, in the name of Ryck et al. and of common assignee, a windshield washer pump assembly was disclosed including electromagnetic means for establishing and controlling the driving connection between the wiper motor and the pump. In Ziegler Patent 2,878,505, a somewhat similar washer pump assembly is disclosed wherein electromagnetic means are utilized to establish the driving connection between the wiper motor and the pump and cam means are utilized to maintain driving connection for a predetermined number of wiper unit strokes. The present invention relates to a washer pump assembly of the type disclosed in the aforementioned copending application which embodies a mechanically actuated latch for controlling the driving connection between the wiper motor and the timing means, the driving connection being initially established by momentarily energizing electromagnetic means.

Accordingly, among our objects are the provision of an improved wiper motor driven windshield washer pump assembly; the further provision of a washer pump assembly including a mechanical latch for maintaining the driving connection between the wiper motor and the timing means after it has been electromagnetically established; and the still further provision of a washer pump assembly including cam operated means for releasing the mechanical latch to terminate the washing cycle.

The aforementioned and other objects are accomplished in the present invention by pivotally mounting the driver for the timing means on a reciprocable slider and utilizing an electromagnet to establish the driving connection between the timing means and the driver and a mechanical latch to maintain such driving connection for a predetermined number of wiper unit strokes. Specifically, the washer unit includes a pump of the bellows type having a spring effected delivery stroke and a wiper motor effected intake stroke. The pump is of the intermittent squirt type and is thus designed to be operated throughout a predetermined number of wiper unit strokes. The pump includes a rod, or plunger, having a lost motion connection with a reciprocable slider and a lug engageable with a lockout cam formed on a ratchet cam assembly constituting the timing means. The reciprocable slider carries a cam follower engageable with a wiper motor driven cam whereby the slider is continuously reciprocated during wiper motor operation. A drive pawl for the ratchet cam assembly is pivotally mounted on the reciprocable slider and is spring biased out of engagement with the ratchet wheel. The drive pawl constitutes an armature for an electromagnet, and upon energization of the electromagnet, the drive pawl is moved into driving engagement with the ratchet wheel. The drive pawl is maintained in engagement with the ratchet wheel by a mechanical latch actuated by a cam on the ratchet cam assembly after a complete revolution of the ratchet cam assembly.

Further objects and advantages of the present invention will be apparent from the following description, reference being had to the accompanying drawing, wherein a preferred embodiment of the present invention is clearly shown.

Figure 1:
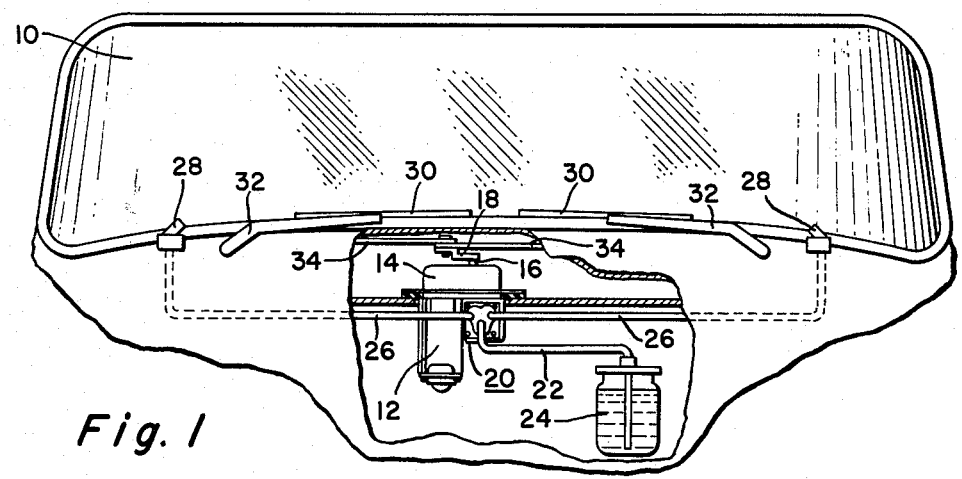
FIGURE 1 is a fragmentary view, partly in section and partly in elevation, of a vehicle equipped with the windshield washer pump of this invention.

With particular reference to FIGURE 1, the improved washer pump assembly is designed for use as a component in a cleaning system for a vehicle windshield 10, the cleaning system comprising an electric wiper motor 12 connected through a suitable gear reduction unit 14 to a unidirectional rotary output shaft 16 carrying a crank 18. A power takeoff from the gear reduction unit 14 is used to operate a windshield washer pump 20 having an intake conduit 22 connected to a solvent reservoir 24 and a pair of delivery conduits 26 connected to spaced nozzles 28. The nozzles 28 are designed to discharge liquid solvent onto predesignated areas of the windshield 10 into the paths of movement of wiper blades 30. The wiper blades 30 are carried by wiper arms 32 which are connected to the rotary crank 18 through a conventional drive mechanism including links 34.

It is to be understood that the use of an electric motor 12 for actuating the wiper blades and the washer pump is only by way of example, since the improved washer pump can be driven from any rotary output shaft, or even an oscillatory output shaft of a pneumatic or hydraulic wiper motor.

Structurally the washer pump 20 is identical to that disclosed in the aforementioned copending application Serial No. 126,051 except for the mechanical latch that is engageable with the drive pawl in a manner to be described hereinafter. Thus, the washer pump 20 comprises a sheet metal frame 36 which is removably secured by means of screws, not shown, to the housing of the gear reduction unit 14. A pump housing 38 is secured to a flange 40 of the frame 36 by screws 41, the pump housing containing an elastomeric bellows, not shown, which is suitably secured to a reciprocable pump rod 44. The pump housing 38 may be composed of plastic and includes a valve chamber part 46 and a spring chamber part 48, these parts being interconnected by screws 50 and 41.

The valve chamber part 46 has an inlet nipple 54 and a pair of outlet nipples 56. The delivery stroke of the pump is effected by a spring, not shown, within the housing part 48, and the intake stroke is effected by outward movement of the rod 44, the movement of the rod 44 also storing energy in the spring.

A reciprocable slider 70 is disposed between the pump rod 44 and the frame 36, the slider 70 having a pin, not shown, attached thereto which extends through a slot, not shown, in the frame 36, and is engageable with a multiple lobe cam, not shown, driven by the wiper motor from the gear reduction unit 14. The pin on the reciprocable slider also extends through an elongate slot, not shown, adjacent the outer end of the pump rod 44. A stud 86 is attached to the frame 36 and rotatably supports a ratchet cam assembly 88. The end of the stud receives a cap 90, a portion of the cap and the stud 86 being encircled by a coil spring clutch 92. The coil spring clutch 92 prevents reverse rotation of the ratchet cam assembly 88.

The ratchet cam assembly 88 includes a toothed periphery 98 constituting a ratchet wheel, an arcuatee lockout cam, not shown, and a face cam, or lug, 102. The stud 86 extends through an elongate slot, not shown, in the pump rod 44 as well as through an elongate slot, not shown, in the slider 70.

Figure 3:
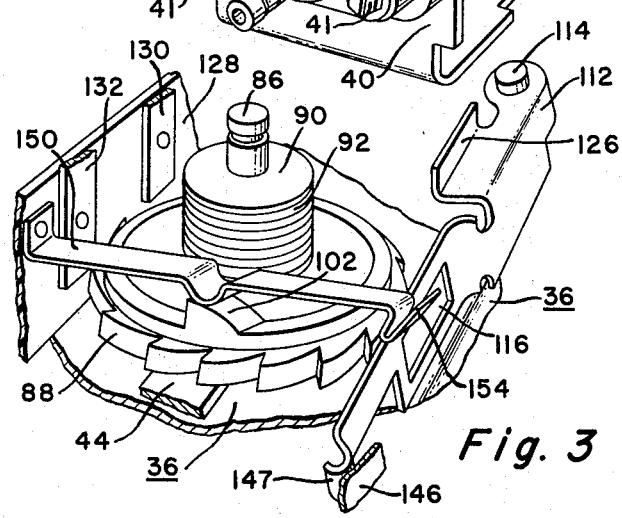
FIGURE 3 is an enlarged fragmentary isometric view, partly in section and partly in elevation, depicting the latch disengaged from the drive pawl.

A drive pawl 112 is pivotally mounted on a stud 114 attached to the slider 70. The drive pawl 112 has a window, or slot, 116 for receiving the teeth 98 on the ratchet wheel and thus is capable of imparting step by step movement to the ratchet cam assembly 88. The stud 114 is encircled by a torsion spring, not shown, which normally biases the drive pawl 112 outwardly to the position shown in FIGURE 3 so as to maintain the drive pawl disengaged from the ratchet teeth 98. An electromagnet 120 including a coil 122 and a core 124 is attached to the frame 36, the drive pawl 112 including a flange portion 126 constituting an armature for the electromagnet.

A terminal board 128 of insulating material is attached to the frame and supports a pair of terminal strips 130 and 132 which are connected by wires 134 and 136, respectively, with the coil 122 of the electromagnet. A leaf spring latch 150 is also attached to the terminal board 128 and extends transversely above a portion of the ratchet cam assembly 88. The leaf spring latch 150 has a follower portion 152 and a latch portion 154 adapted to engage the drive pawl 112 and maintain it in driving engagement with the ratchet teeth 98 after a one tooth movement of the ratchet cam assembly. After a complete revolution of the ratchet cam assembly, the cam lug 102 engages the follower 152 to disengage the latch thereby permitting the pawl 112 to be disengaged from the ratchet teeth 98 by its torsion spring. Outward pivotal movement of the drive pawl 112 by its torsion spring is limited by engagement of the end 147 thereof with the inner surface of a plastic cover 146 which encloses the pump assembly thus holding the air gap between the armature portion 126 of the pawl 112 and the core 124 of the electromagnet.

Figure 2:
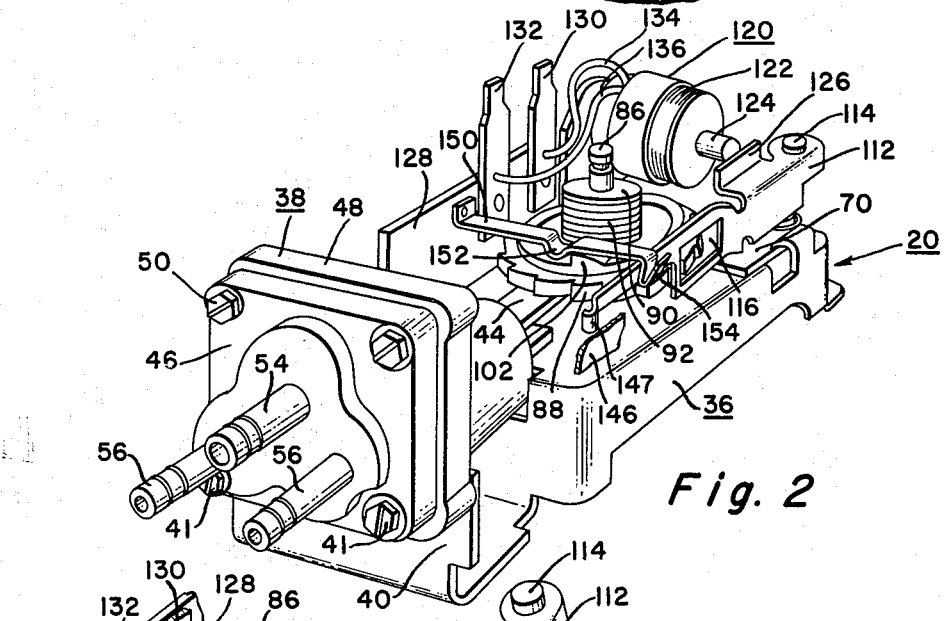
FIGURE 2 is an isometric view of the improved pump assembly with substantially all of the cover broken away, and showing the mechanical latch engaged with the drive pawl.

The improved washer pump operates as follows when the wiper motor 12 is energized. Upon momentary energization of the electromagnet 120, the pawl 112 is moved from the position of FIGURE 3 to the position of FIGURE 2, and during reciprocation of the slider 70, the pawl 112 imparts a one step movement to the ratchet cam assembly 88. Thereafter, the electromagnet 120 can be deenergized since the latch portion 154 of the leaf spring 150 engages the drive pawl as shown in FIGURE 2 and maintains the drive pawl 112 in engagement with the ratchet teeth 98. Accordingly, the ratchet cam assembly 88 will have imparted thereto step by step movement in the counterclockwise direction as viewed in FIGURES 2 and 3, and during reciprocation of the slider 70, the pump rod 44 will be reciprocated to effect intermittent operation of the washer pump 38. After a predetermined angular movement of the ratchet cam assembly 88, and prior to a complete revolution thereof, the lockout cam, not shown, on the ratchet cam assembly will engage a lug, not shown, on the pump rod 44 to arrest movement of the pump rod and thus terminate washer pump operation. However, continued reciprocation of the slider 70 and the drive pawl 112 will continue step by step movement of the ratchet cam assembly 88 until the cam lug 102 engages the follower 152 thereby deflecting the leaf spring 150 and disengaging the latch portion 154 from the drive pawl 112. Thereafter, continued reciprocation of the slider 70 and the drive pawl 112 will neither rotate the ratchet assembly 88 nor reciprocate the pump rod 44.

While the embodiment of the invention as herein disclosed constitutes a preferred form, it is to be understood that other forms might be adopted.

What is claimed is as follows:

1. Drive mechanism for a ratchet member including, a frame, a ratchet member rotatably supported on said frame, a cam actuated reciprocable slider supported on said frame, a drive pawl pivotally mounted on said slider, spring means normally maintaining said drive pawl disengaged from said ratchet member, electrical means operable to effect pivotal movement of said drive pawl into driving engagement with said ratchet member, mechanical means engageable with said drive pawl for maintaining said drive pawl in driving engagement with said ratchet member for imparting step by step movement thereto throughout a predetermined angular movement thereof, and cam actuated means for thereafter releasing said drive pawl.

2. Drive mechanism for a ratchet member including, a frame, a ratchet member rotatably supported on said frame, a cam actuated reciprocable slider supported on said frame, a drive pawl pivotally mounted on said slider, spring means normally maintaining said drive pawl disengaged from said ratchet member, electromagnetic means operable to effect pivotal movement of said drive pawl into driving engagement with said ratchet member, mechanical latch means engageable with said drive pawl for maintaining said drive pawl in driving engagement with said ratchet member for imparting step by step movement thereto throughout a predetermined angular movement thereof, and cam means engageable with said latch means for thereafter releasing said drive pawl.

3. Drive mechanism for a ratchet member including, a frame, a ratchet member rotatably supported on said frame, a cam actuated reciprocable slider supported on said frame, a drive pawl pivotally mounted on said slider, spring means normally maintaining said drive pawl disengaged from said ratchet member, an electromagnetic coil which, upon momentary energization, attracts said drive pawl and pivots it into driving engagement with said ratchet member, mechanical latch means engageable with said drive pawl for thereafter maintaining said drive pawl in driving engagement with said ratchet member and imparting step by step movement thereto throughout a predetermined angular movement thereof, and cam means engageable with said latch means for thereafter releasing said drive pawl.

4. Drive mechanism for a ratchet member including, a frame, a ratchet member rotatably supported on said frame, a cam actuated reciprocable slider supported on said frame, a drive pawl pivotally mounted on said slider, spring means normally maintaining said drive pawl disengaged from said ratchet member, an electromagnet which, upon momentary energization, effects pivotal movement of said drive pawl into driving engagement with said ratchet member for imparting a one step movement thereto during reciprocation of said slider, a leaf spring latch engageable with said drive pawl after said one step movement of said ratchet member for maintaining said drive pawl in driving engagement with said ratchet member throughout a predetermined angular movement thereof, and cam means on said ratchet member for deflecting said leaf spring latch to thereafter release said drive pawl.

5. Drive mechanism for a ratchet member including, a frame, a ratchet member rotatably supported on said frame, a cam actuated reciprocable slider supported on said frame, a drive pawl pivotally mounted on said slider, spring means normally maintaining said drive pawl disengaged from said ratchet member, an electromagnet having a core and a coil whereby momentary energization of said coil effects pivotal movement of said drive pawl into driving engagement with said ratchet member for imparting a one step movement to said ratchet member upon reciprocation of said slider, a leaf spring latch extending transversely across a portion of said ratchet member and engageable with said drive pawl after said one step movement for maintaining said drive pawl in driving engagement with said ratchet member throughout a predetermined angular movement thereof, and a face cam on said ratchet member engageable with said leaf spring latch for deflecting said leaf spring latch to release said drive pawl.

6. The combination set forth in claim 5 wherein said drive assembly is enclosed by a cover and wherein the end of said drive pawl is engageable with the inner surface of said cover, when released, to maintain the air gap between said pawl and said core.

References Cited in the file of this patent

UNITED STATES PATENTS

| | | |
|---|---|---|
| 1,184,848 | Geiger | May 30, 1916 |
| 2,808,729 | Saives | Oct. 8, 1957 |
| 2,925,618 | Ziegler | Feb. 23, 1960 |
| 2,936,476 | Ziegler | May 17, 1960 |
| 3,063,299 | Kosbaf | Nov. 13, 1962 |